(12) United States Patent
Chung et al.

(10) Patent No.: US 8,072,671 B2
(45) Date of Patent: Dec. 6, 2011

(54) DISPLAY DEVICE

(75) Inventors: Yi-Wen Chung, Pingtung County (TW); Chung-Hsin Hsiao, Kaohusiung (TW)

(73) Assignee: Industrial Technology Research Institute, Hsinchu (TW)

( * ) Notice: Subject to any disclaimer, the term of this patent is extended or adjusted under 35 U.S.C. 154(b) by 253 days.

(21) Appl. No.: 12/268,194

(22) Filed: Nov. 10, 2008

(65) Prior Publication Data

US 2009/0168140 A1 Jul. 2, 2009

Related U.S. Application Data

(63) Continuation-in-part of application No. 12/119,447, filed on May 12, 2008.

(30) Foreign Application Priority Data

Dec. 26, 2007 (TW) ................................ 96150260 A

(51) Int. Cl.
*G02F 1/153* (2006.01)
(52) U.S. Cl. .................... 359/273; 359/265; 359/267
(58) Field of Classification Search .................. 359/245, 359/265–275, 490
See application file for complete search history.

(56) References Cited

U.S. PATENT DOCUMENTS

| | | | |
|---|---|---|---|
| 4,916,470 A | 4/1990 | Kovacs et al. | |
| 4,940,689 A | 7/1990 | Ito | |
| 5,073,013 A | 12/1991 | Sonehara et al. | |
| 5,075,798 A | 12/1991 | Sonehara et al. | |
| 6,580,545 B2 | 6/2003 | Morrison et al. | |
| 7,085,003 B1 | 8/2006 | Belkhir | |
| 7,180,649 B2 | 2/2007 | Morrison et al. | |
| 2001/0019037 A1* | 9/2001 | Zakhidov et al. | 216/56 |
| 2008/0030837 A1* | 2/2008 | Ashrit et al. | 359/273 |
| 2008/0310007 A1* | 12/2008 | Agrawal et al. | 359/275 |

OTHER PUBLICATIONS

Ping Jiang et al. "Multicolor Pattern Generation in Photonic Bandgap Composites", Advanced Materials, Jan. 31, 2005, pp. 179-184, vol. 17, No. 2, WILEY-VCH, US.
Hiroshi Fudouzi et al. "Colloidal Crystals with Tunable Colors and Their Use as Photonic Papers", Langmuir, Sep. 30, 2003, pp. 9653-9660, American Chemical Society, US.
Avni A. Argun et al. "The First Truly All-Polymer Electrochromic Devices", Advanced Materials, Aug. 5, 2003, pp. 1338-1341, vol. 15, No. 15, WILEY-VCH, US.
Gursel Sonmez et al. "Red, Green, and Blue Colors in Polymeric Electrochromics", Advanced Materials, Nov. 4, 2004, pp. 1905-1908, vol. 16, No. 21, WILEY-VCH, US.

* cited by examiner

*Primary Examiner* — Ricky Mack
*Assistant Examiner* — Mahidere Sahle

(57) ABSTRACT

A display device is provided. The display device includes a substrate. A first electrode layer is disposed on the substrate. An electrochromic material single layer is disposed on the first electrode layer, wherein the electrochromic material single layer has a plurality of spherical holes inside, and wherein the electrochromic material single layer includes inorganic materials. An electrolytic layer is disposed on the electrochromic material single layer. A second electrode layer is disposed on the electrolytic layer. A power supply is electrically connected to the first and second electrode layers, respectively. The electrochromic material single layer displays red, blue or green colors according to a driving voltage provided by the power supply.

14 Claims, 7 Drawing Sheets

DISPLAY DEVICE

CROSS REFERENCE TO RELATED APPLICATIONS

This application is a Continuation-In-Part of application Ser. No. 12/119,447, filed May 12, 2008, which claims priority of Taiwan Patent Application No. 96150260, filed on Dec. 26, 2007, the entirety of which is incorporated by reference herein.

BACKGROUND OF THE INVENTION

1. Field of the Invention

The invention relates to a display device, and in more particularly relates to a full color electrochromic display device.

2. Description of the Related Art

Electrochromic materials are expected to replace liquid crystal materials as a mainstream material of display applications moving forward. For display applications, full color technology of the electrochromic materials is a key research area following successful development of rapid voltage switching mechanisms. When an electric field is applied to the electrochromic materials, the electrochromic materials may present different colors due to the shift of the color center absorption peak and may show a high absorption of light rays in a visible spectrum range. When no electric field is applied to the electrochromic materials, the electrochromic materials may present a bleached state and show a low absorption of light rays in a visible spectrum range. Potential applications for the electrochromic materials due to the aforementioned colored or bleached state include applications in smart windows for buildings or cars, in order to prevent rising indoor temperature due to sunlight, or low-end display devices. For display device applications, the electrochromic materials may present colors without conventional backlight modules or color filters. Therefore, the electrochromic materials have advantages of higher contrast ratio and very wide viewing angle, for example, 0 degree to 180 degrees. Additionally, the electrochromic materials have advantages of lower energy consumption due to the lower required applied voltage for driving an electrochromic mechanism of about ±1V. Thus, due in part to the aforementioned advantages, application of the electrochromic materials has the potential to breakthrough some of the technological bottlenecks associated with conventional liquid crystal display devices. However, the color gamut for the electrochromic materials is currently not wide enough to comprise the three primary colors (red, blue and green). Therefore, there are still challenges, such as developing an electrochromic display device with full color or flexible substrates capable of full color, before electrochromic display devices may replace conventional liquid crystal display devices.

Therefore, a full color electrochromic display device is needed.

BRIEF SUMMARY OF INVENTION

To solve the above-described problems, a display device is provided. An exemplary embodiment of a display device comprises a substrate. A first electrode layer is disposed on the substrate. An electrochromic material single layer is disposed on the first electrode layer, wherein the electrochromic material single layer has a plurality of spherical holes inside, and wherein the electrochromic material single layer comprises inorganic materials. An electrolytic layer is disposed on the electrochromic material single layer. A second electrode layer is disposed on the electrolytic layer. A power supply is electrically connected to the first and second electrode layers, respectively. The electrochromic material single layer displays red, blue or green colors according to a driving voltage provided by the power supply.

Another exemplary embodiment of a display device comprises a substrate. A first electrode layer is disposed on the substrate. A photonic crystal structural layer is disposed on the first electrode layer, wherein the photonic crystal structural layer comprises inorganic materials. An electrolytic layer is disposed on the photonic crystal structural layer. A second electrode layer is disposed on the electrolytic layer. A power supply is electrically connected to the first and second electrode layers, respectively, wherein the power supply is used to provide driving voltage, such that the photon crystal structural layer displays red, blue or green colors according the driving voltage.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of a mode of carrying out the invention. This description is made for the purpose of illustrating the general principles of the invention and should not be taken in a limiting sense. The scope of the invention is best determined by reference to the appended claims.

Figure 1:
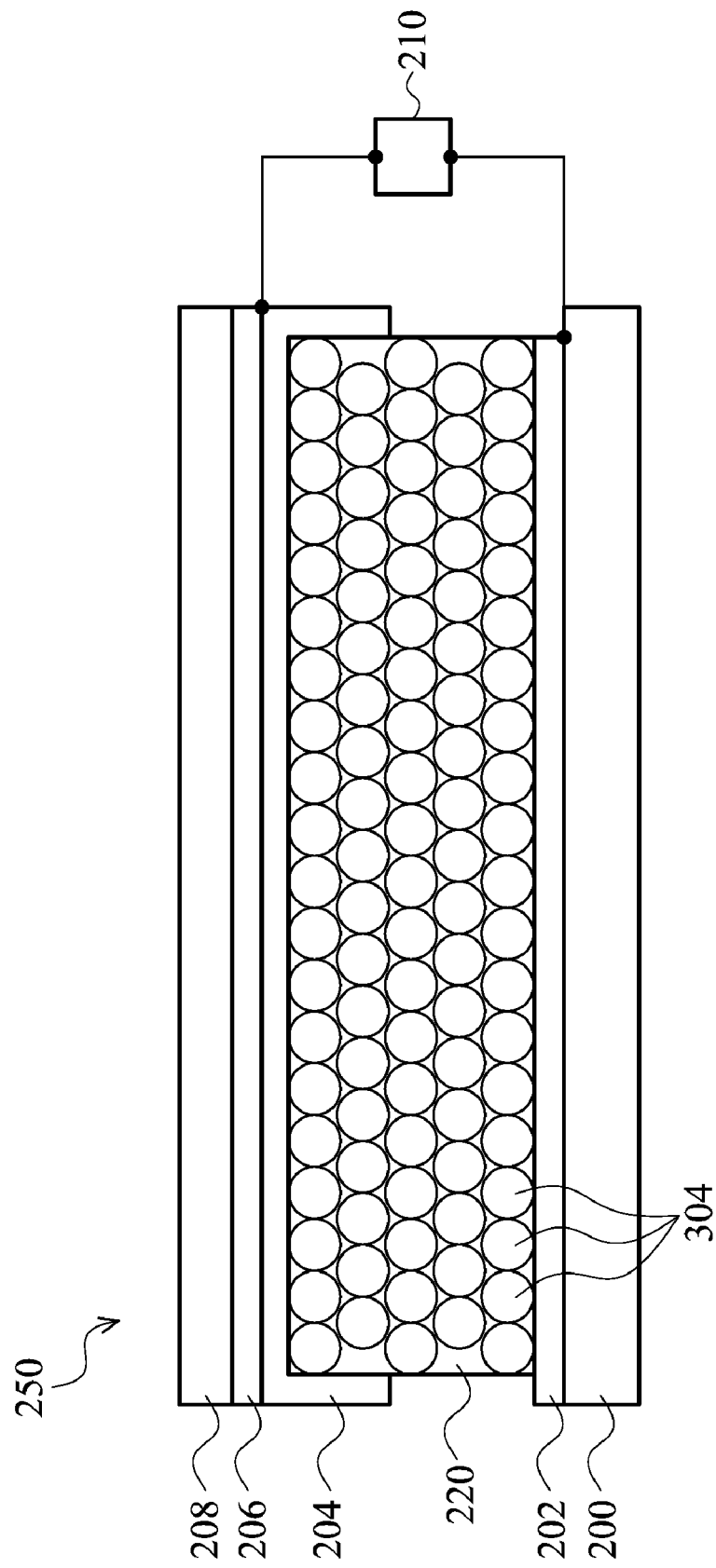
FIG. 1 shows a cross section of an exemplary embodiment of a display device of the invention.

FIG. 1 shows a cross section of an exemplary embodiment of a display device 250 of the invention. In one embodiment, the display device 250 may be a display device only having one pixel. In other embodiment, the display device 250 of the invention may be a display device having a plurality of pixels. The display device 250 comprises a substrate 200. In one embodiment, the substrate 200 may comprise a hard substrate or a flexible substrate, wherein the hard substrate may comprise glass, and the flexible substrate may comprise polyethylene terephthalate (PET), polycarbonate (PC), polyethylene naphthalate (PEN) or the like. A first electrode layer 202 is disposed on the substrate 200. An electrochromic material single layer 220 is disposed on the first electrode layer 202, wherein the electrochromic material single layer 220 has a plurality of spherical holes 304 inside. In one embodiment, the electrochromic material single layer 220 may comprise organic or inorganic materials, wherein the organic materials comprise polyaniline, and the inorganic materials comprise Prussian blue ($Fe_3[Fe(CN)_6]_4$). An electrolytic layer 204 is disposed on the electrochromic material single layer 220. In one embodiment, the electrolytic layer 204 is used to provide a communication path of electrons or holes of the bleached or colored electrochromic material single layer 220. The electrolytic layer 204 may comprise solid polymer electrolytes or gelled-type polymer electrolytes. A second electrode layer 206 is disposed on the electrolytic layer 204, wherein the second electrode layer 206 may comprise a transparent electrode layer. The display device 250 may also comprise a transparent conductive layer 208 disposed on the second electrode layer 206. In one embodiment, the transparent conductive layer 208 may comprise indium tin oxide (ITO), which may be used to provide an electric field with the first electrode layer 202 and the second electrode layer 206. A power supply 210 is electrically connected to the first second electrode layer 202 and the second electrode layer 206, respectively, wherein the power supply 210 is used to provide a driving voltage, such that the electrochromic material single layer 220 may display red, blue or green colors according to the driving voltage.

The electrochromic materials may display various colors according to different driving voltages. In one embodiment, the electrochromic materials, for example, polyaniline, displays deep green with driving voltage of about 0.2V, yellowish-brown with negative driving voltage, and deep blue with driving voltage of about 1V. Alternatively, the electrochromic materials, for example, Prussian blue, is colorless with driving voltage of about −1V, blue with driving voltage of about 1V, and green with driving voltage of about 0.2V. An exemplary embodiment of an electrochromic material single layer 220 may be an electrochromic material single layer having a photonic crystalline structure. Therefore, the electrochromic material single layer 220 may serve as a photonic crystal structural layer 220. The photonic crystal structural layer 220 may not only display various colors according to different driving voltages, but also have an adjustable color gamut by modifying the photonic crystalline structure to achieve a goal of displaying full color. In one embodiment, the electrochromic materials, for example, polyaniline, is an electrochromic material with a color gamut comprising yellowish-brown, deep green and deep blue. Alternatively, the electrochromic materials, for example, Prussian blue, is an electrochromic material with a color gamut comprising colorless, green and blue. When the electrochromic material single layer 220 is formed by the aforementioned electrochromic materials having a photonic crystalline structure, the color gamut of the electrochromic material single layer 220 may red-shift to a color gamut comprising three primary colors (red, blue and green). Additionally, displaying colors of the electrochromic material single layer 220 having a photonic crystalline structure may be modified to display three primary colors by proper driving voltages, such that the display device 250 has a color gamut comprising three primary colors (red, blue and green) in one pixel. In other words, one embodiment of a display device 250 of the invention may achieve a goal of displaying full color without a conventional color filter.

A photonic crystalline structure is disclosed by Yablonovitch and John in 1987. Fabricating processes of photonic crystalline structures have matured in recent years, due to nanotechnology developments. A photonic crystalline structure is a special periodic array constructed by two kinds of materials having different dielectric constants (or refractive indices). When light rays incident into a photonic crystalline structure, a photonic band gap phenomenon occurs. Specifically, a photonic crystalline structure may total reflect light rays with a specific wavelength, and light rays with other wavelengths may penetrate the photonic crystalline structure. The total-reflection wavelength is defined as a wavelength occurrence due to the photonic band gap phenomenon. Generally, a photonic crystalline structure is formed by two materials comprising a functional material and air. There are various types of photonic crystalline structures. One popular type of photonic crystalline structure is formed by periodic arrays of functional material spheres with air filling into the interstices among the functional material spheres. Another type of popular photonic crystalline structure is formed by periodic arrays of air spherical holes carved into a functional material film. The aforementioned two types of popular photonic crystalline structures present periodic arrays. The functional material spheres and air spherical holes may be stacked as a face-centered cubic (fcc) distribution, simple cubic distribution and body centered cubic (bcc) distribution, preferably as an fcc distribution. And a layer number of the stacking functional material spheres and air spherical holes may be greater than eight to provide a path that is long enough for light rays, diffracting in a photonic crystalline structure, to present the photonic band gap phenomenon.

Figure 2:
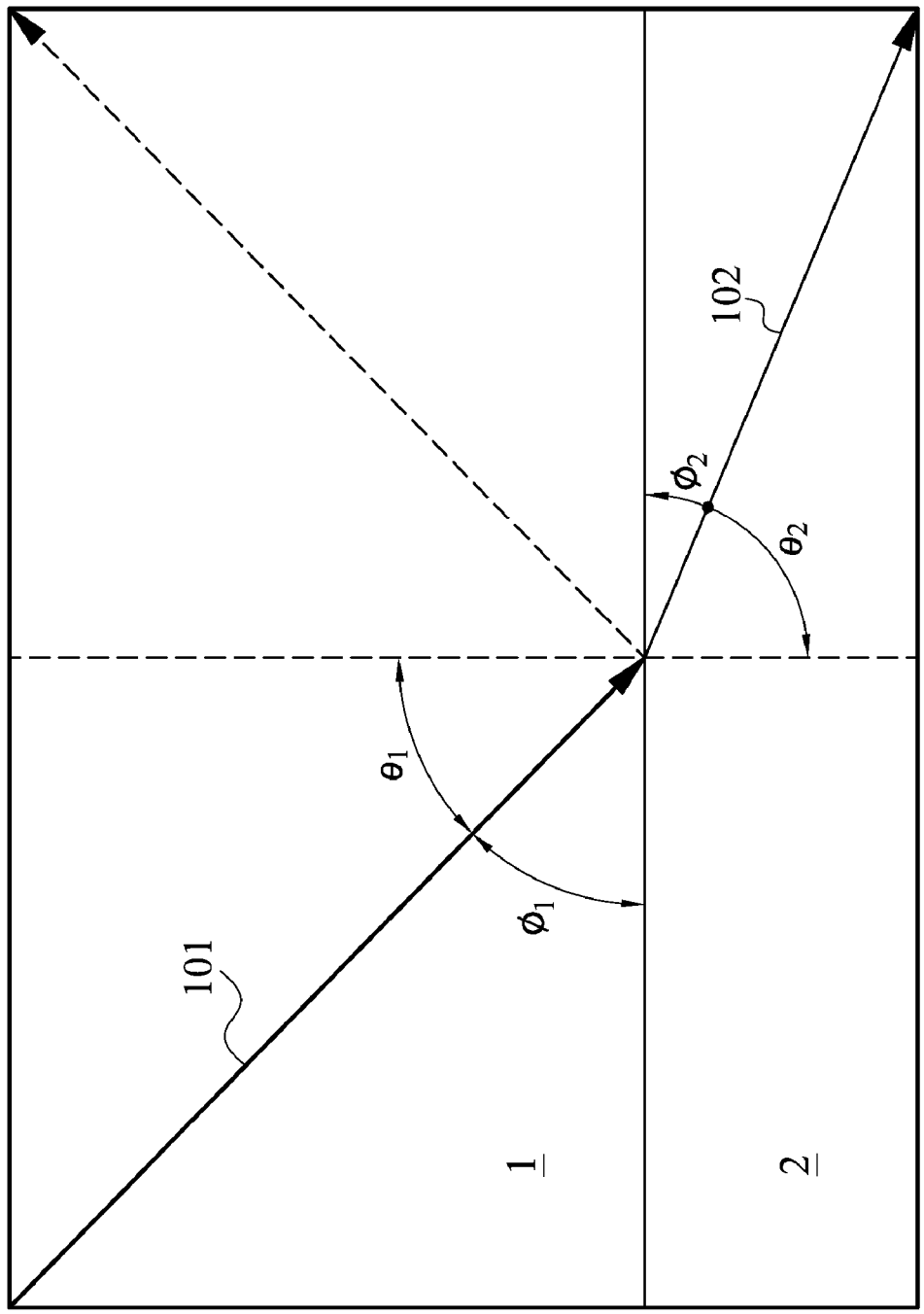
FIG. 2 shows the illustration for the phenomenon of light passing through material

For further discussion of optical characteristics, a photonic crystalline structure may present a tunable photonic band gap phenomenon for light rays with a specific wavelength by controlling the periodic structure. Such a tunable photonic band gap phenomenon is defined according to a modified Bragg's law, which is derived by Bragg's law and Snell's law. First, Snell's law is shown as function (1) as below:

$$n_1 \cdot \sin\theta_1 = n_2 \cdot \sin\theta_2 \tag{1}$$

wherein $n_1$ is defined as a refractive index of media 1, $n_2$ is defined as a refractive index of media 2, $\theta_1$ is defined as an angle of incident light rays 101 and $\theta_2$ is defined as an angle of refractive light rays 102, as depicted in FIG. 2.

Second, Bragg's law is shown as function (2) as below:

$$n\lambda = 2d_{i,j,k} \sin\phi \tag{2}$$

wherein n is an integer, $d_{i,j,k}$ is defined as a distance of two adjacent crystal planes along a (i, j, k) direction, $\lambda$ is defined as a wavelength of incident light rays and $\phi$ is defined as an angle between the incident light rays and a crystal plane, as depicted in FIG. 2.

Next, Snell's law may be modified as function (3) as below:

$$\frac{\sin\theta_1}{\sin\theta_2} = \frac{\sin\left(\frac{\pi}{2} - \phi_1\right)}{\sin\left(\frac{\pi}{2} - \phi_2\right)} = \frac{\cos\phi_1}{\cos\phi_2} = \frac{n_2}{n_1} \tag{3}$$

Thus, functions (2) and (3) may be combined as function (4) as below:

$$\frac{\lambda_1}{n_2} = 2 \cdot d_{i,j,k} \cdot \left(1 - \left(\frac{n_1}{n_2}\right)^2 \cdot \cos^2\phi_1\right)^{1/2} \tag{4}$$

Finally, a modified Bragg's law is shown as function (5) as below:

$$\lambda_1 = 2 \cdot d_{i,j,k} \cdot (n_2^2 - n_1^2 \cdot \sin^2\theta_1)^{1/2} \tag{5}$$

wherein $n_2$ is defined as an average refractive index of a photonic crystalline structure, and $n_1$ is usually defined as a refractive index of air (1.0003). Function (5) may be simplified as function (6) as below:

$$\lambda = 2 \cdot d_{i,j,k} \cdot (n_{\it{eff}}^2 - \sin^2\theta)^{1/2} \tag{6}$$

wherein $\theta$ is defined as an angle between the incident light rays and a crystal plane normal line of an interface, $n_{\it{eff}}$ is defined as a total effective refractive index of two media as shown in function (7) as below:

$$n_{\it{eff}}^2 = f \cdot n_{material}^2 + (1-f) \cdot n_{air}^2 \tag{7}$$

wherein $n_{material}$ is defined as a refractive index of a material, $n_{air}$ is defined as a refractive index of air. and $d_{i,j,k}$ is defined as a distance of two crystal planes along a (i, j, k) direction as shown as function (8) as below:

$$d_{i,j,k} = \frac{D}{\sqrt{i^2 + j^2 + k^2}}. \quad (8)$$

wherein D is defined as an edge length of a unit cell.

A photonic crystalline structure is generally stacked as a face-centered cubic (fcc) distribution, and the close packed plane is a plane (111). Therefore, an edge length of a unit cell (D) and a diameter of a sphere (a) may be shown as function (9) as below:

$$D = \frac{2a}{\sqrt{2}} = \sqrt{2}\,a. \quad (9)$$

Finally, $d_{i,j,k}$ may be modified as function (10) as below:

$$d_{111} = \frac{\sqrt{2}\,a}{\sqrt{3}}. \quad (10)$$

Next, when function (10) is substituted in function (6), function (11) is derived as shown below:

$$\lambda = 2 \cdot \sqrt{\frac{2}{3}} \cdot a \cdot (n_{\it eff.}^2 - \sin^2\theta)^{0.5} = 1.63 \cdot a \cdot (n_{\it eff.}^2 - \sin^2\theta)^{0.5}. \quad (11)$$

Function (11) may describe special optical characteristics of a photonic crystalline structure. When light rays perpendicularly ($\theta=0°$) incident into a photonic crystalline structure, function (11) may be modified as function (12) as below, wherein values "a" and "$n_{\it eff.}$" of function (12) may determine a total reflection wavelength ($\lambda$) of a photonic crystalline structure:

$$\lambda = 1.63 \cdot a \cdot (n_{\it eff.}) \quad (12).$$

When looking at function (12), one skilled in the art may know that the total reflection wavelength ($\lambda$) may be controlled by tuning values "a" and "$n_{\it eff.}$" of function (12), and the total reflection wavelength ($\lambda$) shows color perceived by the human eye.

A high quality photonic crystalline structure may not only present a photonic band gap phenomenon, but also present a macroscopic characteristic of uniform color from the structure's surface. When full spectrum light rays are incident into a photonic crystalline structure with periodic arrays, a part of the light rays, which wavelengths are matched by the modified Bragg's law, may have a diffraction phenomenon in the photonic crystalline structure and reflect a specific wavelength. Other light rays, which wavelengths are not matched be the modified Bragg's law, may not have a diffraction phenomenon. Therefore, the color gamut of a photonic crystalline structure may be modified by tuning values "a" and "$n_{\it eff.}$" Of the modified Bragg's law.

FIRST EMBODIMENT

Figure 3A:
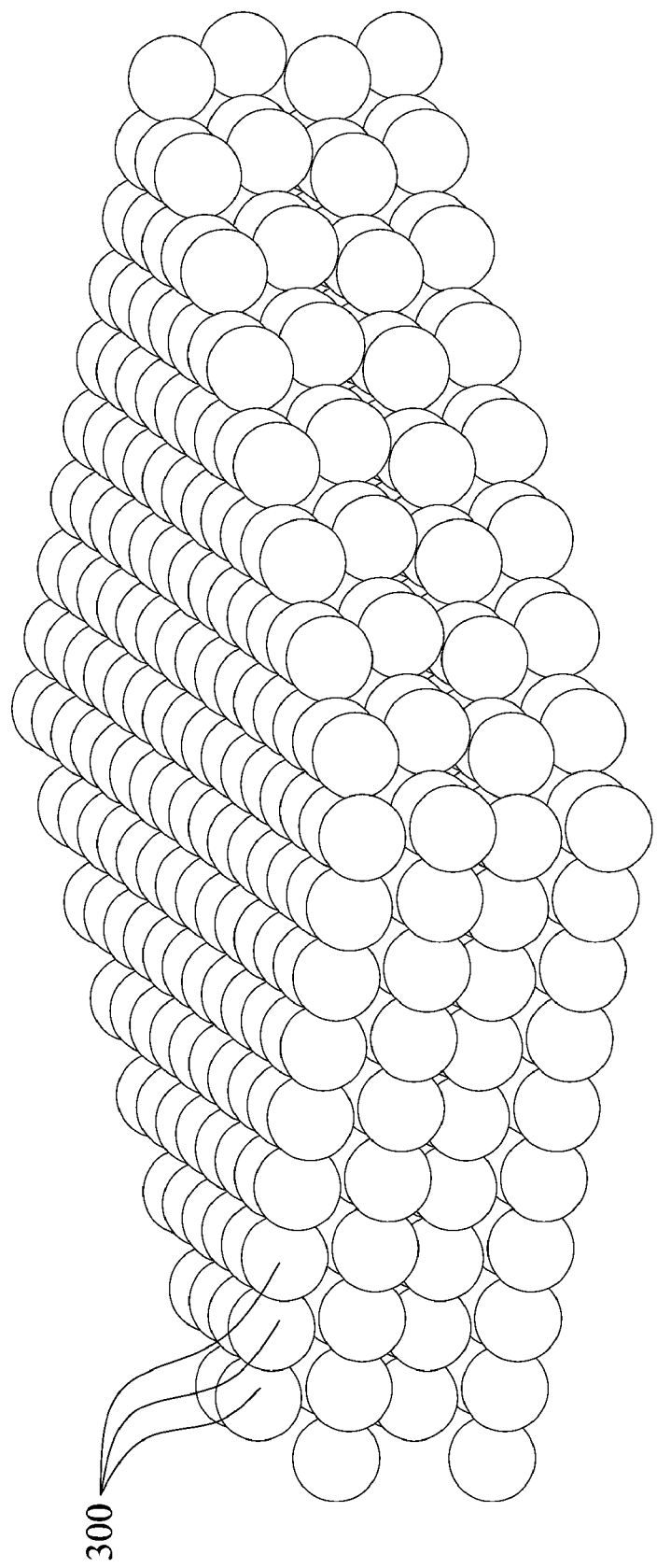
FIGS. 3a to 3b show a schematic view of an exemplary embodiment of fabricating an electrochromic material single layer of the invention.
Figure 3B:
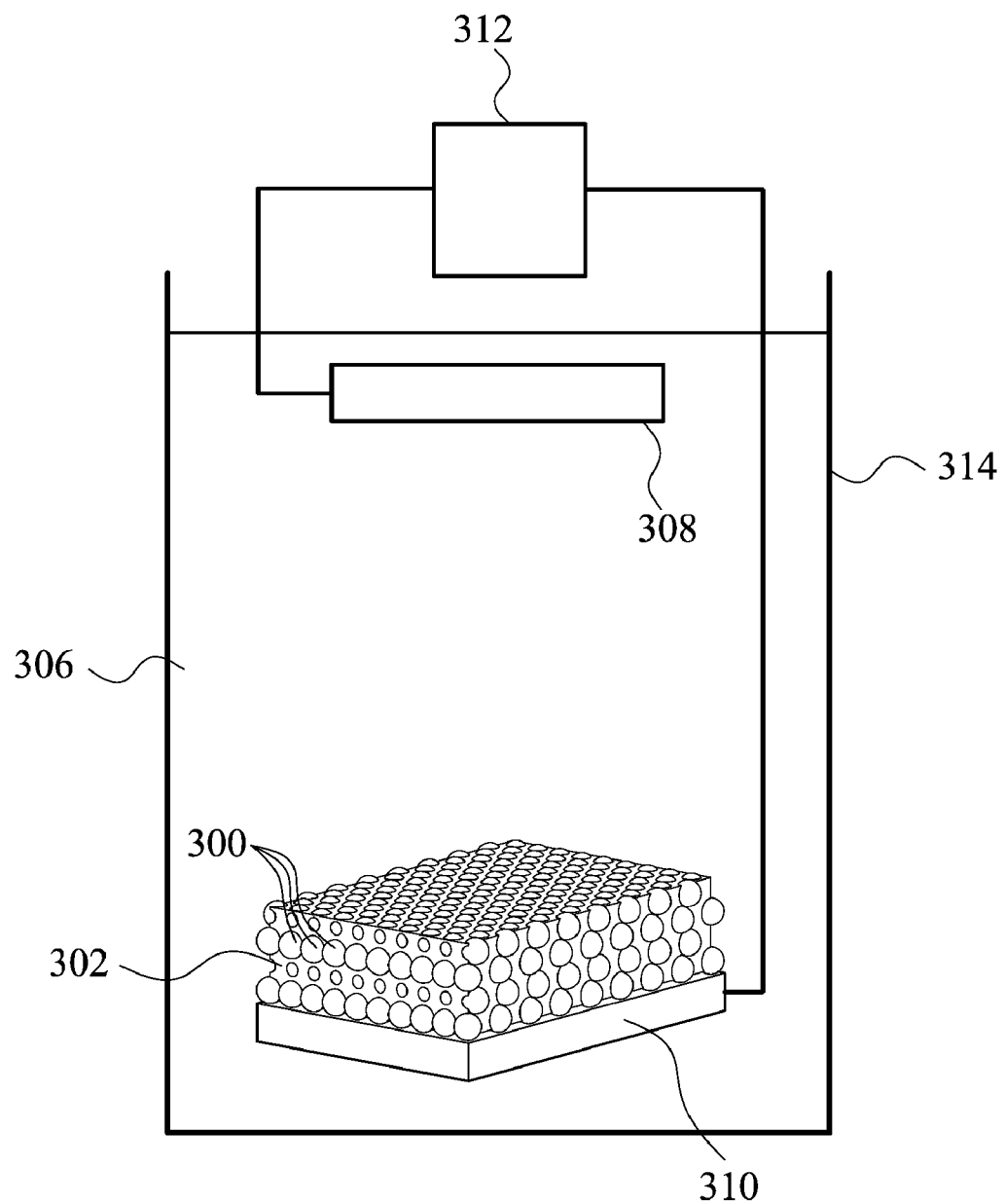
Figure 3C:
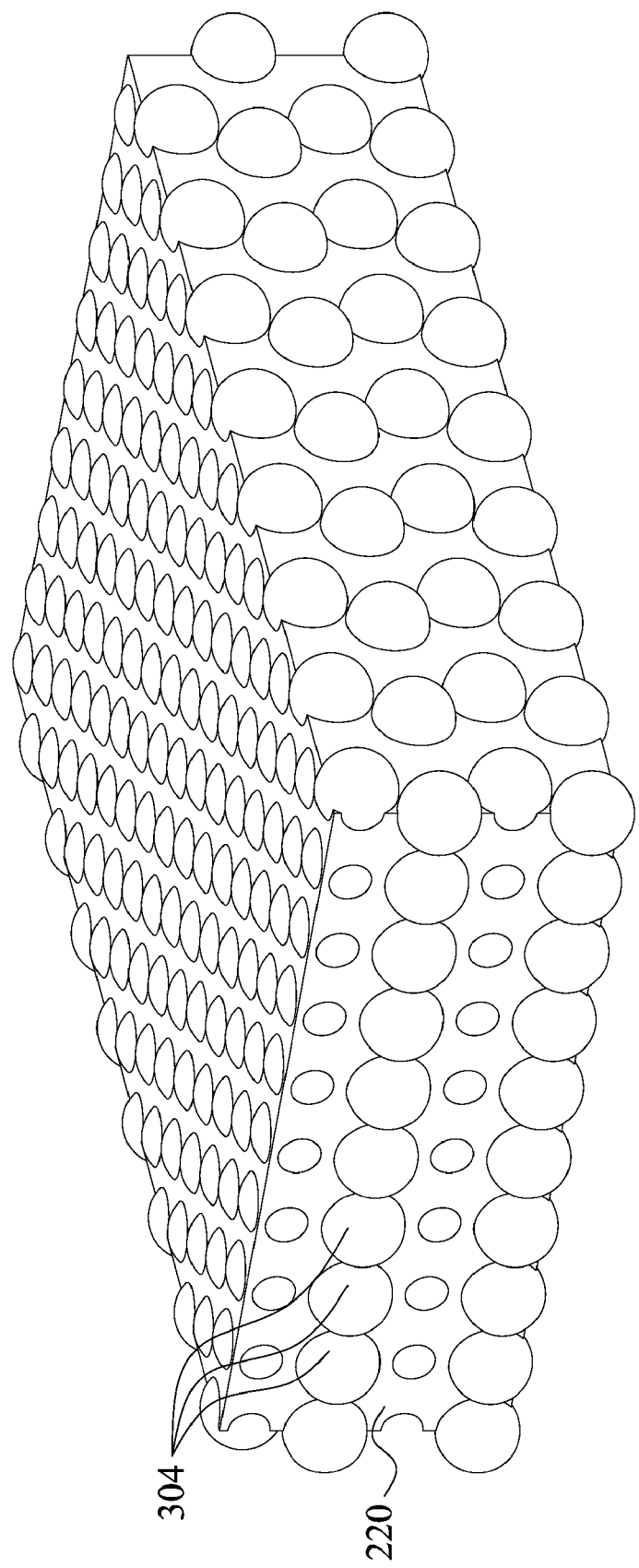
Figure 3D:
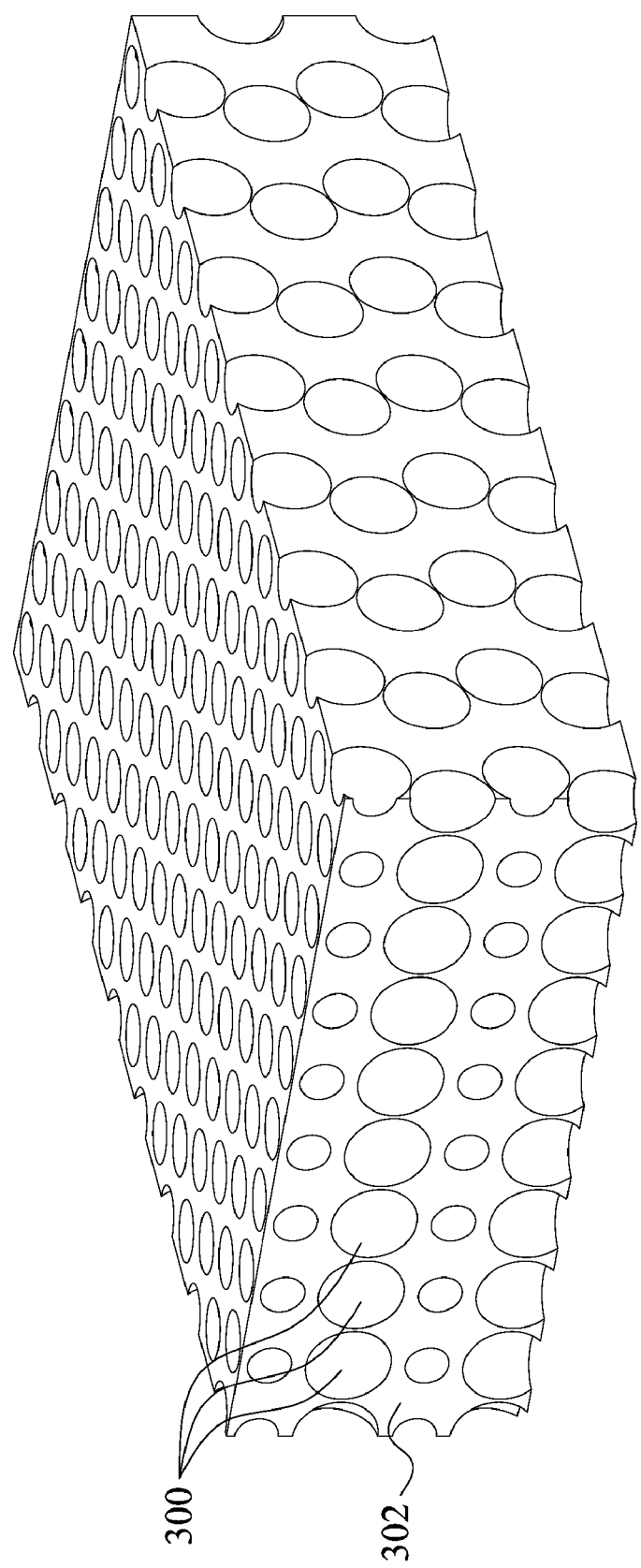

In this embodiment, the electrochromic material single layer 220, for example, polyaniline, is fabricated as a photonic crystalline structure as shown in FIG. 3d. According to function (12), value "a" shows diameters of spherical holes 304. Therefore, color of the electrochromic material single layer 220 may be controlled by tuning diameters of the spherical holes 304. Polyaniline displays yellowish-brown when the driving voltage is negative. In this embodiment, the electrochromic material single layer 220 may be modified to display yellowish-brown to red for negative driving voltage, showing a color gamut comprising three primary colors (red, blue and green). Therefore, a specific total reflection wavelength ($\lambda$) for total reflection of the electrochromic material single layer 220 is defined as about 610 nm. The total effective refractive index "$n_{\it eff.}$" of the electrochromic material single layer 220 is about 1.16 by calculation. Next, a total reflection wavelength ($\lambda$) and an effective refractive index "$n_{\it eff.}$" substituted in function (12), result in value "a" of about 323 nm by calculation. That is to say, in one embodiment, each of the spherical holes 304 in the electrochromic material single layer 220, for example, polyaniline, has a diameter of about 323 nm. Therefore, the electrochromic material single layer 220 may present red.

Figure 4:
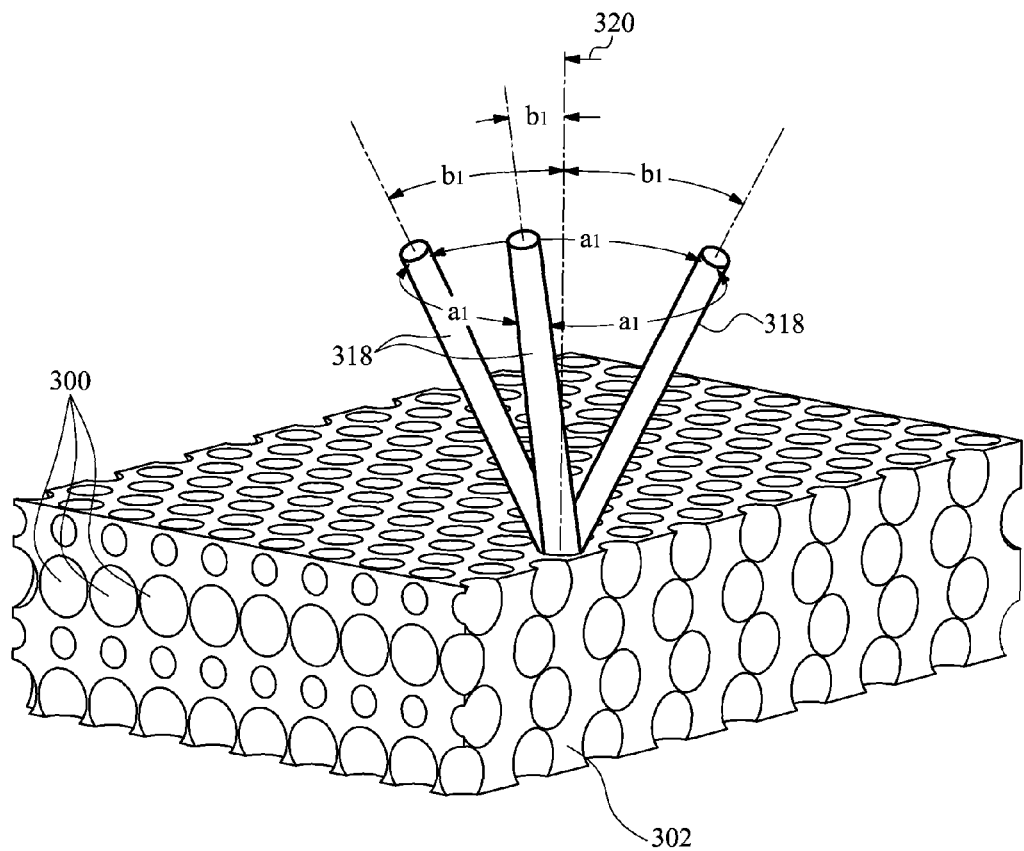
FIG. 4 shows a schematic view of another exemplary embodiment of fabricating an electrochromic material single layer of the invention.

The electrochromic material single layer 220 having a photonic crystalline structure may have two fabricating methods. One fabricating method is by a template-mediated process, and the another fabricating method is by a direct etching process. Compared with the direct etching process, the template-mediated process is simpler and has lower costs. FIGS. 3a to 3b show a schematic view of an exemplary embodiment of fabricating an electrochromic material single layer 220 of the invention. FIG. 4 shows a schematic view of another exemplary embodiment of fabricating an electrochromic material single layer 220 of the invention. As shown in FIG. 3a, a plurality of colloidal particles 300 with a uniform diameter may be formed by, for example, an emulsifier-free emulsion polymerization process. The colloidal particles 300 are used as templates of spherical holes 304 in the electrochromic material single layer 220 as shown in FIG. 1. Next, the colloidal particles 300 are dispersed in an aqueous solution. A substrate 200 comprises a first conductive layer 202 thereon, as shown in FIG. 1, is then disposed in the bottom of the aqueous solution. Next, the aqueous solution with the colloidal particles 300, is placed in a higher evaporative temperature (45° C.) and humidity (90%). Then, a three-dimensional (3-D) crystalline structure of the colloidal particles 300, stacked as a face-centered cubic (fcc) distribution, is completely formed in 24 hours. The colloidal particles 300 may comprise polystyrene (PS), silicon dioxide (SiO$_2$), (polymethylmethacrylate (PMMA) or III-V materials. In this embodiment, the colloidal particles 300 may comprise polystyrene (PS). A layer number of a plurality of the stacking colloidal particles 300 is greater than eight to provide a path long enough for light rays diffracting in the subsequence electrochromic material single layer 220 to present a photonic band gap phenomenon.

Next, an electrochromic material, for example, polyaniline, may fill into spaces between the stacking colloidal particles 300 as shown in FIGS. 3b and 3c by a nano-channel-filling technology, for example, electrochemistry polymerization. As shown in FIG. 3b, a three-dimensional (3-D) crystalline structure of the colloidal particles 300, stacked as a face-centered cubic (fcc) distribution, is disposed in an electrochemistry polymerization solution 306, which is formed by mixing aniline, sulfuric acid and water, contained in a container 314. The colloidal particles 300 are disposed between the electrodes 308 and 310. An electrochromic material film 302 is then formed by electrochemistry polymerization using a power supply 312, which is electrically connected to the electrodes 308 and 310, with about a IV fixed voltage.

As shown in FIG. 3d, the colloidal particles 300 as shown in FIG. 3c is then removed to form an electrochromic material single layer 220 having a plurality of spherical holes 304 using organic solvents, for example, tetrahydrofuran (THF). During the template-mediated process, diameters of the colloidal particles 300 may determine diameters of the spherical holes 304. The electrochromic material single layer 220 may shrink about 20% in volume during the removal of the colloidal particles 300. Therefore, diameters of the colloidal particles 300 are about 404 nm to compensate for the volume shrinkage effect. As shown in FIG. 3d, the electrochromic material single layer 220 is a red film. The electrochromic material single layer 220 may also present green or blue colors by controlling the driving voltage. In this embodiment, the electrochromic material single layer 220 may display red with negative driving voltage, light green with driving voltage of about 0.2V, and light blue with driving voltage of about 1V. Therefore, achieving an electrochromic mechanism displaying three primary colors (red, blue and green) in a single layer. Further, multi-color level displaying in a single layer may be achieved by fine-tuning the driving voltage. Therefore, successfully developing a full-color electrochromic display technology.

Additionally, the electrochromic material single layer 220 having a plurality of the spherical holes 304 may also be formed by a direct etching method. FIG. 4 shows a schematic view of another exemplary embodiment of an electrochromic material single layer 220 of the invention fabricated by the etching method. During the direct etching method, a plurality of spherical holes 316, which are in a period arrangement, are etched in the electrochromic material single layer 220 along three directions using drilling tools 318, for example, mechanical drilling tools, an electronic beam (E-beam), a laser beam or ultraviolet rays (UV). An angle $a_1$ among the three directions may be about 120°, and an angle $b_1$ between one of the three directions and a normal line 320 to the electrochromic material single layer 220 may be about 30°. In this embodiment, diameters of the spherical holes 316 may be about 323 nm.

SECOND EMBODIMENT

In this embodiment the electrochromic material single layer 220, for example, Prussian blue, is fabricated as a photonic crystalline structure as shown in FIG. 3d. In this embodiment, the electrochromic material single layer 220, for example, Prussian blue, may be modified to display transparency to red for negative driving voltage, showing a color gamut comprising three primary colors (red, blue and green). Therefore, a specific total reflection wavelength (λ) for total reflection of the electrochromic material single layer 220 is defined as about 610 nm. The total effective refractive index "$n_{eff}$" of the electrochromic material single layer 220 is about 1.16 by calculation. Next, a total reflection wavelength (λ) and an effective refractive index "$n_{eff}$" substituted in function (12), result in value "a" of about 323 nm by calculation. That is to say, in one embodiment, each of the spherical holes 304 in the electrochromic material single layer 220, for example, Prussian blue, has a diameter of about 323 nm. Therefore, the electrochromic material single layer 220 may present red with negative driving voltage.

In this embodiment, the electrochromic material single layer 220 may be formed by a template-mediated process as shown in FIGS. 3a to 3d or by a direct etching process as shown in FIG. 4. As shown in FIG. 3a, a plurality of colloidal particles 300 with a uniform diameter may be formed on the substrate 200 comprises a first conductive layer 202 thereon. The colloidal particles 300 are used as templates of spherical holes 304 in the electrochromic material single layer 220 as shown in FIG. 1. Next, the colloidal particles 300 are dispersed in an aqueous solution. The colloidal particles 300 may be formed as a three-dimensional (3-D) crystalline structure with a face-centered cubic (fcc) distribution. A layer number of a plurality of the stacking colloidal particles 300 is greater than eight. The colloidal particles 300 may comprise polystyrene (PS), silicon dioxide ($SiO_2$), (polymethyl-methacrylate (PMMA) or III-V materials. In this embodiment, the colloidal particles 300 may comprise polystyrene (PS).

Next, an electrochromic material, for example, Prussian blue, may fill into spaces between the stacking colloidal particles 300 as shown in FIGS. 3b and 3c by an electrodeposition method. As shown in FIG. 3b, a three-dimensional (3-D) crystalline structure of the colloidal particles 300, stacked as a face-centered cubic (fcc) distribution, is disposed in an electrochemistry polymerization solution 306 of Prussian blue contained in a container 314. The colloidal particles 300 are disposed between the electrodes 308 and 310. An electrochromic material film 302 is then formed on the electrode 310 using a power supply 312, which is electrically connected to the electrodes 308 and 310.

As shown in FIG. 3d, the colloidal particles 300 as shown in FIG. 3c is then removed to form an electrochromic material single layer 220 having a plurality of spherical holes 304 using organic solvents, for example, tetrahydrofuran (THF). The electrochromic material single layer 220 may shrink about 20% in volume during the removal of the colloidal particles 300. Therefore, diameters of the colloidal particles 300 are about 404 nm to compensate for the volume shrinkage effect in this embodiment, thereby diameters of the resulting spherical holes 304 being about 323 nm. As shown in FIG. 3d, the electrochromic material single layer 220, for example, Prussian blue, is a red film with a negative driving voltage. The electrochromic material single layer 220 may also present green or blue colors by controlling the positive driving voltage. In this embodiment, the electrochromic material single layer 220, for example, Prussian blue, may display red with negative driving voltage, green with driving voltage of about +0.2V, and blue with driving voltage of about +0.6V. Therefore, achieving an electrochromic mechanism displaying three primary colors (red, blue and green) in a single layer. Further, multi-color level displaying in a single layer may be achieved by fine-tuning the driving voltage. Therefore, successfully developing full-color electrochromic display technology.

Additionally, the electrochromic material single layer 220 having a plurality of the spherical holes 304 may also be formed by a direct etching method as shown in FIG. 4. During the direct etching method, a plurality of spherical holes 316, which are in a period arrangement, are etched in the electrochromic material single layer 220 along three directions using drilling tools 318, for example, mechanical drilling tools, an electronic beam (E-beam), a laser beam or ultraviolet rays (UV). An angle $a_1$ among the three directions may be about 120°, and an angle $b_1$ between one of the three directions and a normal line 320 to the electrochromic material single layer 220 may be about 30°. In this embodiment, diameters of the spherical holes 316 may be about 323 nm.

An exemplary embodiment of a display device 250 of the invention may have some advantages. The electrochromic material single layer 220 of the display device 250 is an electrochromic material layer having a photonic crystalline structure. The electrochromic material single layer 220 may have a color gamut comprising three primary colors (red, blue and green) in one pixel through modification of the photonic crystalline structure, and the electrochromic material single layer 220 may display various colors according to driving voltages. Further, multi-color level displaying in a single layer may be achieved by fine-tuning the driving voltage. Therefore, successfully developing a full-color electrochromic display technology. The electrochromic material single layer 220 of the display device 250 may have advantages of low energy-consumption or high contrast. Also, the electrochromic material single layer 220 of the display device 250 may be applied with flexible substrate processes. Meanwhile, one embodiment of a display device 250 of the invention may have a color gamut comprising three primary colors (red, blue and green) in one pixel and achieve a full color goal without conventional color filters, liquid crystal layers or backlight modules. Additionally, the display device 250 may have advantages of low energy consumption or high contrast ratio, such that the display device 250 may be applied in display applications, and especially in flexible displays or electronic paper displays.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device, comprising:
   a substrate;
   a first electrode layer disposed on the substrate;
   a Prussian blue electrochromic single layer disposed on the first electrode layer, wherein the Prussian blue electrochromic single layer has a plurality of spherical holes inside, wherein each of the spherical holes filled with air has a diameter of 310 nm to 340 nm;
   an electrolytic layer disposed on the Prussian blue electrochromic single layer;
   a second electrode layer disposed on the electrolytic layer; and
   a power supply electrically connected to the first and second electrode layers, respectively, wherein the power supply is used to provide a driving voltage, such that the Prussian blue electrochromic single layer displays red, blue and green colors according the driving voltage.

2. The display device as claimed in claim 1, wherein a plurality of the spherical holes stacks as a three-dimensional crystalline structure.

3. The display device as claimed in claim 2, wherein a layer number of a plurality of the stacking spherical holes is greater than eight.

4. The display device as claimed in claim 2, wherein a plurality of the spherical holes stacks as a face-centered cubic (fcc) structure.

5. The display device as claimed in claim 1, wherein the electrolytic layer comprises solid polymer electrolytes or gelled-typed polymer electrolytes.

6. The display device as claimed in claim 1, further comprising a transparent conductive layer disposed on the second electrode layer.

7. The display device as claimed in claim 1, wherein the substrate comprises a hard substrate or flexible substrate.

8. A display device, comprising:
   a substrate;
   a first electrode layer disposed on the substrate;
   a Prussian blue photonic crystal structural layer disposed on the first electrode layer, wherein the Prussian blue photonic crystal structural layer has a plurality of spherical holes filled with air, wherein each of the spherical holes has a diameter of 310 nm to 340 nm;
   an electrolytic layer disposed on the Prussian blue photonic crystal structural layer;
   a second electrode layer disposed on the electrolytic layer; and
   a power supply electrically connected to the first and second electrode layers, respectively, wherein the power supply is used to provide driving voltage, such that the Prussian blue photonic crystal structural layer displays red, blue and green colors according the driving voltage.

9. The display device as claimed in claim 8, wherein a plurality of the spherical holes stacks as a three-dimensional crystal structure.

10. The display device as claimed in claim 9, wherein a layer number of a plurality of the stacking spherical holes is greater than eight.

11. The display device as claimed in claim 8, wherein a plurality of the spherical holes stacks as a face centered cubic (fcc) structure.

12. The display device as claimed in claim 8, wherein the electrolytic layer comprises solid polymer electrolytes or gelled-typed polymer electrolytes.

13. The display device as claimed in claim 8, further comprising a transparent conductive layer disposed on the second electrode layer.

14. The display device as claimed in claim 8, wherein the substrate comprises a hard substrate or flexible substrate.

* * * * *